Aug. 22, 1944.   H. W. JONES ET AL   2,356,197
BLOWPIPE DEVICE
Filed Dec. 19, 1941   5 Sheets-Sheet 1

INVENTORS
HOMER W. JONES
WILGOT J. JACOBSSON
BY
ATTORNEY

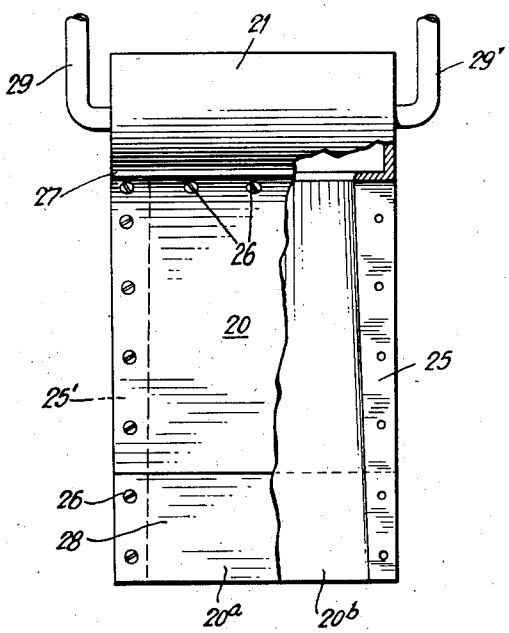
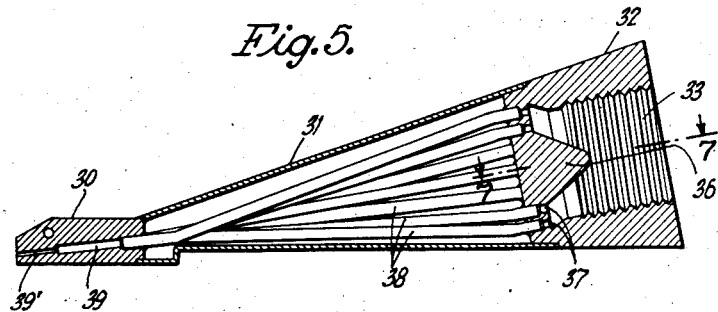
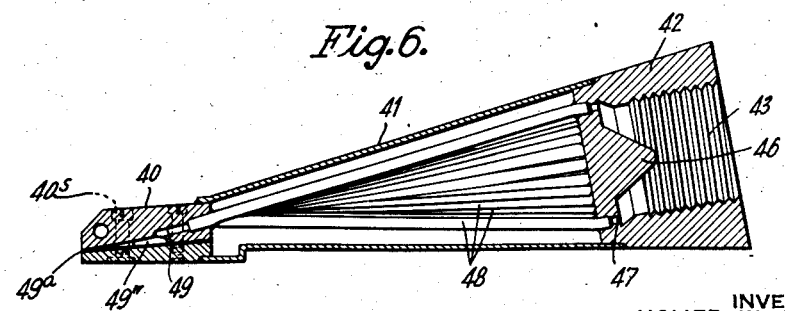

Aug. 22, 1944. H. W. JONES ET AL 2,356,197
BLOWPIPE DEVICE
Filed Dec. 19, 1941 5 Sheets-Sheet 3
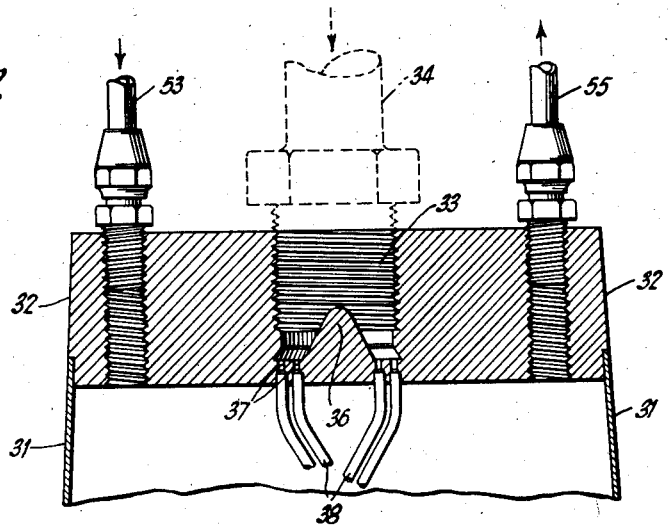
 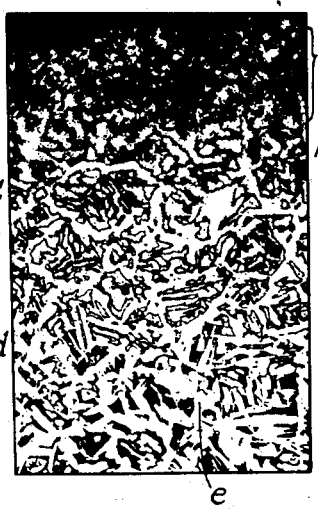 
INVENTORS
HOMER W. JONES
WILGOT J. JACOBSSON

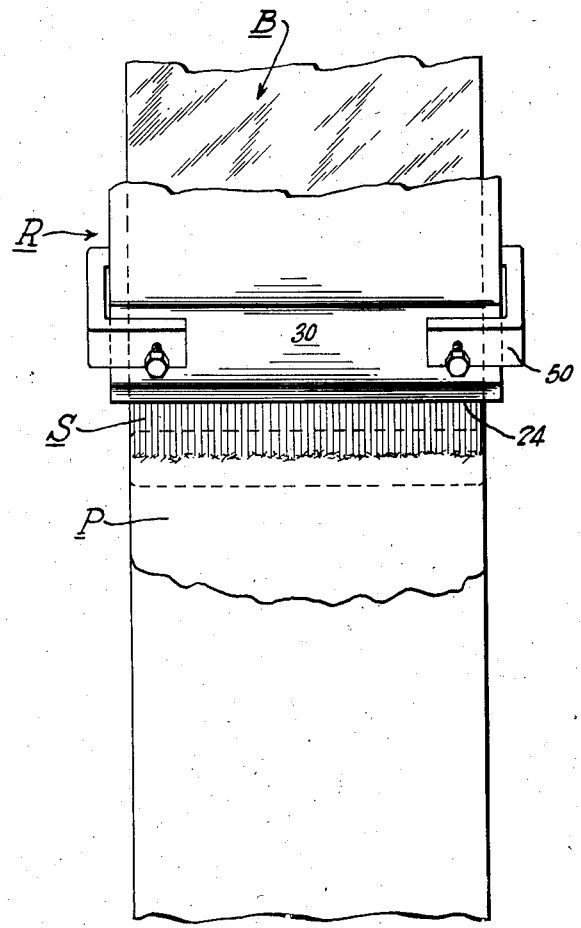

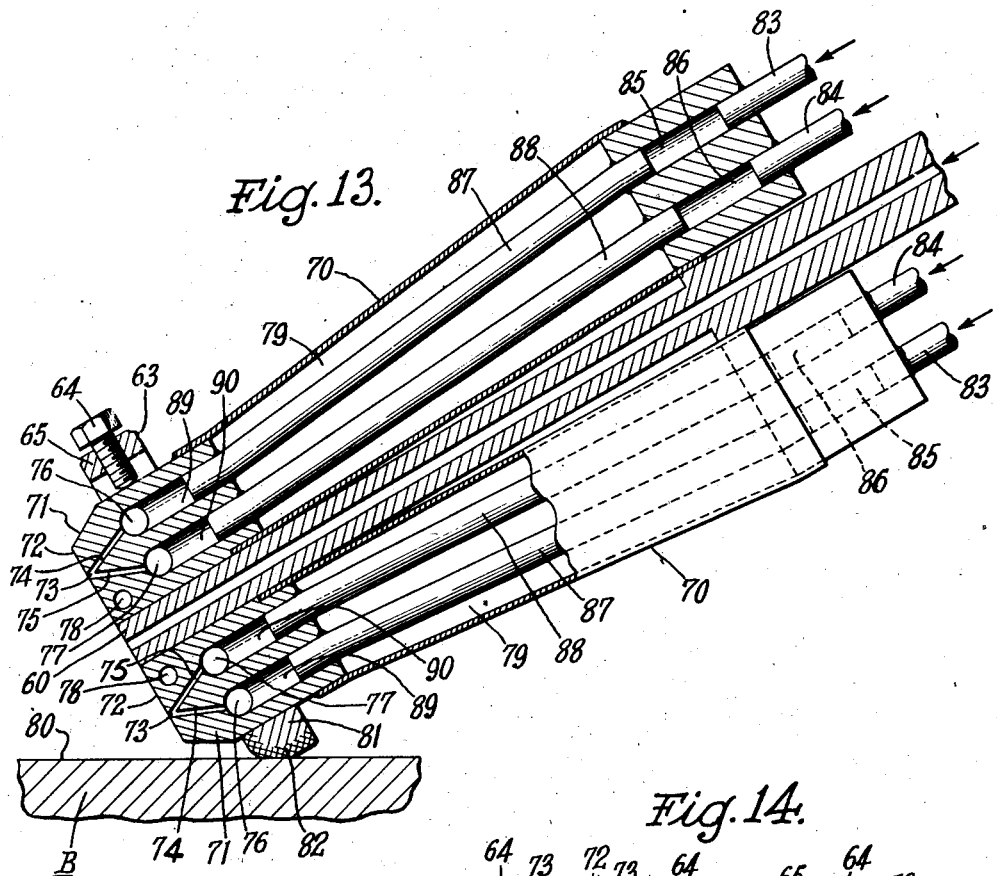
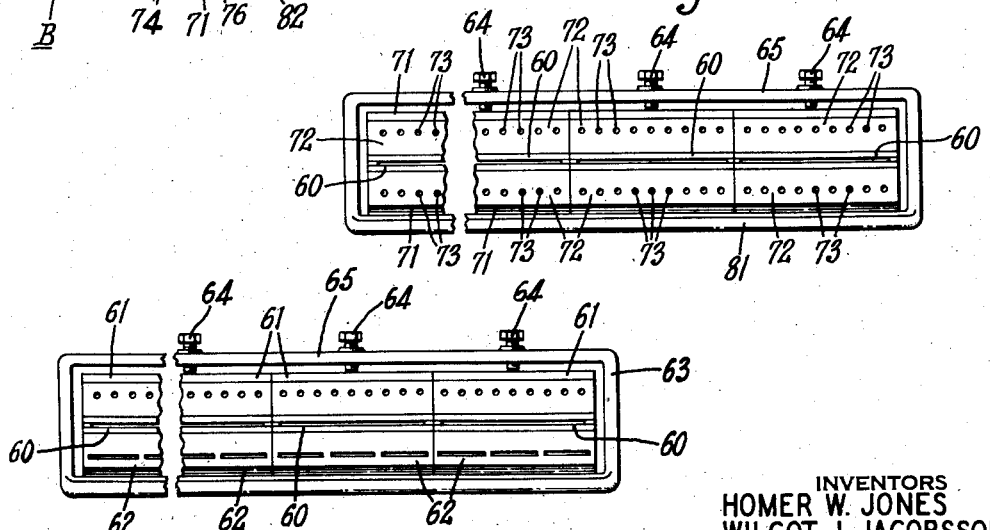

Patented Aug. 22, 1944

2,356,197

UNITED STATES PATENT OFFICE

2,356,197

BLOWPIPE DEVICE

Homer W. Jones, Westfield, and Wilgot J. Jacobsson, Plainfield, N. J., assignors to The Linde Air Products Company, a corporation of Ohio Application December 19, 1941, Serial No. 423,618

9 Claims. (Cl. 266—23)

This application is a continuation-in-part of application Serial No. 107,334, filed October 24, 1936, patented December 23, 1941, No. 2,267,405.

The invention relates to blowpipe devices and more particularly to apparatus for thermo-chemically desurfacing ferrous metal bodies in wide, plane paths of a desired depth which are sufficient to accomplish substantially complete removal of checks, seams and like defects that occur in the region removed.

The invention has for its object generally the provision of a suitable construction and arrangement of parts for practicing steps so as to accomplish a desurfacing operation in a manner such that the thermo-chemical removing reaction is carried out by applying an oxidizing gas to remove metal simultaneously and to a uniform depth over a relatively wide area of the surface when raised to the ignition temperature.

More specifically, the invention has for its object the provision of means for applying an oxidizing gas upon the surface of ferrous metal bodies where the surface is to be removed in wide or broad paths, in combination with improved preheating means for raising the surface metal to the ignition temperature; suitable means being also provided for causing relative motion between the bodies to be desurfaced and the combined oxidizing gas applying and preheating means whereby wide, smooth cuts of uniform depth may be taken.

Another object is to provide an improved oxidizing gas applying nozzle structure with preheating means arranged so as to project the reacting gases as a thin plane sheet or uninterrupted ribbon-like stream, whereby a wide, smooth, level path, devoid of undesirable defects may be readily made.

Still another object is to provide a blowpipe device for scarfing ferrous metal in which the preheating gas nozzle apparatus is made in interchangeable flame nozzle units, detachable and separate with respect to corresponding units of the oxidizing gas nozzle structure, so that the blowpipe device may be built up to scarf work of any desired width, individual units may be replaced as desired, and either premixed or externally mixed flame nozzle units may be assembled, as desired, with oxidizing gas nozzle units.

Another object is to provide a novel blowpipe device including an oxidizing gas nozzle unit and a detachable post-mixed flame unit or head of the type shown in application Serial No. 326,880, filed March 30, 1940, assembled therewith for effectively performing a desurfacing or deseaming operation entirely without danger due to explosions within the blowpipe device.

Other objects of the invention will in part be obvious and will in part appear hereinafter.

The invention accordingly comprises the apparatus embodying features of construction, combinations and arrangement of parts, all as exemplified in the detailed disclosure hereinafter set forth, and the scope of the invention will be indicated in the claims.

For a fuller understanding of the nature and objects of the invention reference should be had to the following detailed description taken in connection with the accompanying drawings, in which:

Fig. 4 is a top plan view, a part being broken away of the structure which applies the oxidizing gas employed in the device shown in Figs. 2 and 3;

Fig. 5 is a central sectional view of one of the preheating means shown in Fig. 2;

Fig. 6 is a similar view of the other form of preheating means shown in Fig. 2;

Fig. 7 is a sectional view taken on the line 7—7 in Fig. 5;

Fig. 8 is a reproduction of a photomicrograph of about 100 magnifications showing a cross-section of a billet of mild steel desurfaced by means of a gang of nozzles applying a plurality of streams of oxidizing gas, the section being taken through the cut edge and just below the surface in the region of a ridge forming a groove in the surface of the billet;

Fig. 9 is a reproduction of a photomicrograph of the same magnification as Fig. 8 showing a cross-section of the same billet taken through the cut edge just below the surface in a region between two ridges;

Fig. 10 is a reproduction of a photomicrograph of the same magnification as Fig. 8 showing a cross-section through the cut edge of a billet of similar composition to that in Fig. 8 but desurfaced by means of oxidizing gas from a wide orificed nozzle;

Fig. 11 is a plan view of a billet being desurfaced and shows the contour of a typical reaction zone;

Fig. 12 is a view similar to Fig. 3 of a modification in which a plurality of interchangeable flame nozzle units arranged in upper and lower rows are used with a plurality of oxidizing gas nozzle units;

Fig. 13 is a view in section similar to Fig. 2 of another modification in which the flame nozzle units are of the externally or post-mixed type; and Fig. 14 is an end view of the blowpipe device shown in Fig. 13.

Figure 1:
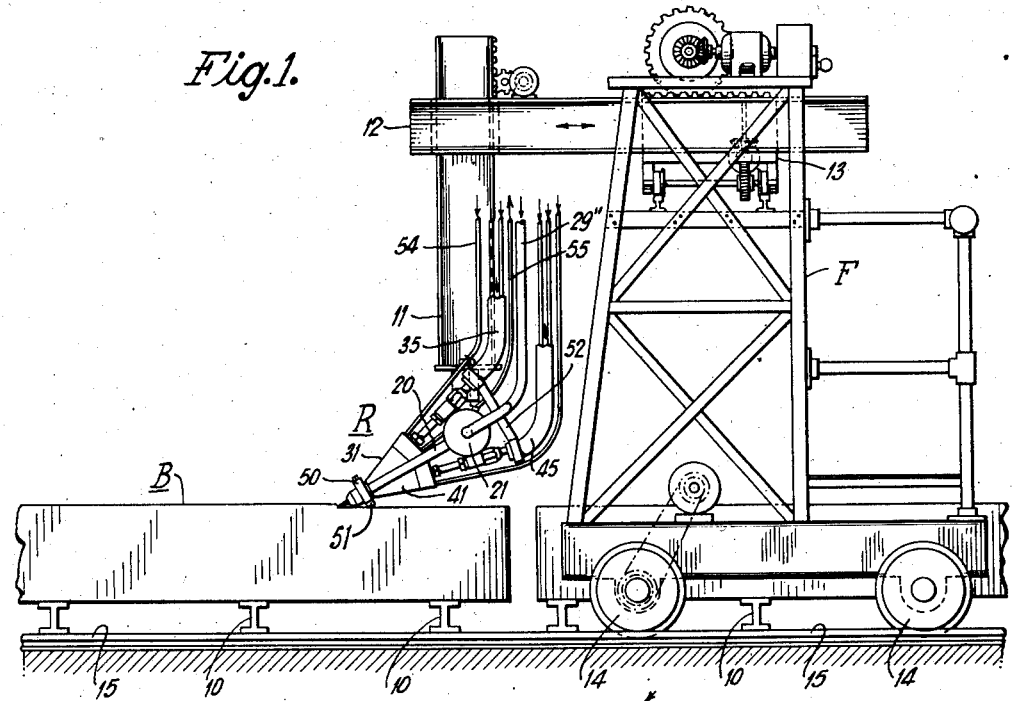
Fig. 1 shows, mainly in side elevation, an arrangement of apparatus having means for thermo-chemically removing surface metal from billets in steel mills, in accordance with the invention.

In order to accomplish the removal of surface metal from ferrous metal bodies in steel mills, such as from ingots, blooms, billets, and the like, for the purpose of eliminating checks, seams, cracks and other defects in the surface, it has been customary to apply a relatively voluminous stream of oxidizing gas at a relatively low velocity so as to impinge upon the surface to be removed at an acute angle to a tangent to the surface drawn in the direction in which a surface removing cut is to be taken. Nozzles with cylindrical bores are quite generally employed in this art for applying the oxidizing gas, such nozzles being relatively closely disposed and arranged in gangs when it was desired to remove a relatively wide area. Such use of spaced nozzles brought about metal removal of transversely non-uniform depth and resulted in leaving, in effect, a parallel-grooved surface. While such surface unevenness, for example, in the form of contiguous corrugations, had some advantage in assisting the absorption of heat in subsequent reheating operations, there are certain manufacturing operations where a billet having a substantially faultless plane surface is desired. There is also an economy in removing metal to a uniform minimum depth sufficient to eliminate the surface defects.

Juxtaposing a plurality of nozzles so closely that the flaring streams overlap at the surface to be removed only partially accomplishes the desired object, while grooves and ridges, which prevent a surface being entirely plane, still occur. In certain cases, it has been proposed to widen the oxidizing gas applying nozzles, but efforts to widen such nozzles have not heretofore been entirely satisfactory to effect proper pressure and velocity distribution at all points across the width of the impinged gas stream.

In the practice of the present invention, steps are taken and a thermo-chemical removing device provided, by which the oxidizing gas is applied through a nozzle structure arranged to emit a relatively wide but transversely narrow ribbon-like stream. For this purpose, the nozzle structure has a wide but thin orifice which is arranged to have the width dimension disposed substantially parallel to the surface to be removed so that when the nozzle structure is applying oxidizing gas, a uniform wide, plane, continuous reaction puddle is formed upon the surface which is being removed. In order, however, that the surface removing reaction may be uniform across the entire width of the reaction zone, the mass-velocity of the gas applied is kept substantially constant. This requires that a substantially uniform pressure in the oxidizing gas be maintained at all points across the orifice. This pressure distribution is achieved by the provision of suitable gas distributing means in association with the nozzle structure together with a suitably shaped nozzle passage. This distributing means is constructed to provide a substantially constant head of pressure at all points along the inlet to the nozzle passage. As a result, the oxidizing gas issues as an uninterrupted, smooth, ribbon-like stream, which has substantially equal mass-velocities at all points across the width of a path that is cut.

The term "mass-velocity," as herein used, is employed to connote the mass of the oxidizing gas issuing from the nozzle at any given point per unit of time per unit of area and does not have the dimensions of a momentum in the usual mechanical sense.

The preheat applying means are preferably associated with the sides (i. e., above and below the horizontal nozzle structure) of the ribbon-like oxidizing gas stream and in a manner which gives heating jets of a character insuring quick and adequate heating of the metal at points where the oxidizing gas is impinged, the jets being so shaped and distributed to avoid interference with the oxidizing gas stream.

Referring now to the drawings, and particularly to Fig. 1, an embodiment of suitable apparatus for the practice of the present invention is illustrated, in which B denotes one or more billets that are disposed on suitable supports 10 for a desurfacing operation in a steel mill. The thermo-chemical metal removing step is effected by means shown generally at R, which comprises a combination of oxidizing gas and preheating nozzles as hereinafter more fully explained, the means being supported in place by a depending member 11 which is secured on an arm 12 that is carried by a carriage 13 on a traveling frame F. The frame F is shown by way of illustration as being supported by means of wheels 14 adapted to track on the rails 15 that are laid on the ground or other base adjacent the supports 10.

Figure 2:
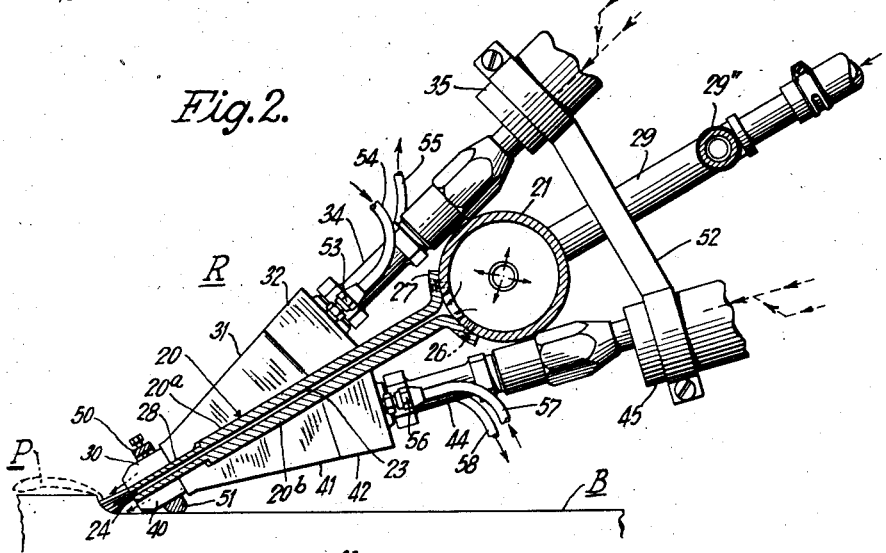
Fig. 2 is an enlarged fragmentary view, partly in section and partly in elevation, showing details of the construction of the means employed for desurfacing a billet in the apparatus of Fig. 1.
Figure 3:
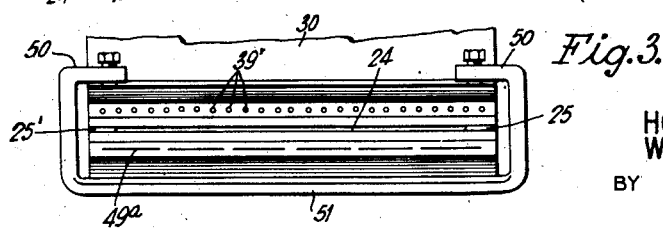
Fig. 3 is a front elevational view of the desurfacing means shown in Fig. 2.

The thermo-chemical reacting means R, as shown in Fig. 2, comprises a centrally disposed oxidizing gas applying nozzle structure 20 with which communicates a gas distributing means, in the form of a chamber 21, arranged to insure a supply of gas at proper pressure. The nozzle structure 20, as seen further in Figs. 3 and 4, is constructed to be relatively wide and flat and has a relatively wide but transversely narrow interior channel 23 of rectangular cross-section through which the oxidizing gas passes from the distributing chamber 21 to the orifice 24. Any convenient construction may be employed to this end. For example, a pair of spaced plates of a suitable material, such as copper or brass, having a thickness sufficient to impart the desired strength, as shown at 20ª and 20ᵇ in the drawings, may be employed, the desired spacing being obtained by inserting suitably formed spacing members 25 and 25' at the edges, these spacing members being secured by suitable means, such as screws, shown at 26. The spacing members 25 and 25' do not have either uniform width or thickness but are specially formed so as to impart a taper or divergence to the rectangular channel which cooperates in achieving the desired uniform velocity of the issuing gas across the orifice. The shape imparted is preferably arranged so that the smallest section is adjacent to but not precisely at the inlet, so that a constricted throat is formed just beyond the inlet to the channel from which it gradually expands toward the orifice. The expansion in the oxidizing gas effected by the taper thus provided is of a character adapted to compensate for the relatively high gas velocities which are normally associated with each side of the channel when parallel, and the relatively low velocities adjacent the center. Such distribution, inherent with the parallel sides, tends to produce grooved cuts instead of the plane surface desired. With a taper in both the plane of the width dimension and the plane perpendicular thereto of proper values, the relatively low center velocities are increased and relatively uniform values across the entire width of the rectangular orifice may be had. As an example of suitable values, it may be stated that when the members 25 and 25' have their inside edges inclined in the plane of the width dimension at an angle of 2½ degrees to the center line, as shown in Fig. 4, and make an angle of approximately ½ degree to the center line in the perpendicular plane, they substantially effect the desired distribution of velocities for the range of operating pressures customarily employed. The plates 20ª and 20ᵇ preferably have their ends adjacent the inlet struck up, as shown at 27, to provide securing flanges whereby the nozzle structure may be secured to the distributing chamber 21. While these plates may have substantially uniform thickness from the distributing head to the orifice, it is preferable that these plates be reduced at their lower ends in order to provide an offset area as shown at 28, to assist in positioning the preheating devices in proper relation to the orifice 24.

The distributing means 21, while it may have any suitable form which provides a supply of oxidizing gas to the rectangular channel in the nozzle in a manner such that there is a substantially uniform pressure linearly along the inlet to the channel, is advantageously in the form of a cylindrical chamber that is relatively large and has a substantially unobstructed opening communicating with the rectangular orifice. The desired pressure distribution in the chamber is further assisted by providing oxidizing gas inlet conduits 29 and 29' that lead from a manifold 29" and communicate at the respective ends of the chamber. In this way, a substantially static pressure condition in the chamber is provided.

The preheating means shown comprises heating flame projecting devices associated with both sides of the oxidizing gas nozzle structure, each device being preferably secured on an area 28 in rigid position on the oxidizing gas structure, i. e., on upper and lower sides of the orifice 24, as shown in Figs. 2 and 3. While the preheating devices on the upper and lower sides of the main nozzle structure may be substantially identical, there are advantages in constructing the same differently, since these two preheating devices perform specifically different functions. A suitable form for the upper device is shown in Fig. 5, while a suitable form of the lower device is shown in Fig. 6.

In Fig. 5, the upper device is shown as comprising an orificed member or block 30 in association with a shell-like casing 31 of somewhat wedge-like formation; the casing being closed by another block 32. This latter block has a central gas supplying and distributing bore 33 which is threaded to receive a conduit 34 from a gas mixing chamber 35 which is arranged to provide a combustible heating gas, such as a mixture of oxygen and acetylene. The bore 33 is closed at one end by a partition having a central distributing member or upwardly projecting cone 36, about which are a plurality of small orifices 37 bored through the partition in the annular space about the cone. A group of small tubular passage members 38 are provided in the shell 31 leading respectively from each orifice 37 to one of the nozzle bores shown at 39 as somewhat obliquely disposed and in substantially equally spaced relation along the length of the block or member 30. The bores 39 may be of substantially uniform diameter from end to end but preferably have the outermost portions reduced, as shown at 39'; the oblique disposition of the bores being such as to be inclined downwardly and project the heating gas so that it will approach and in some measure impart heat to the stream of oxidizing gas issuing from the rectangular orifice 24.

The preheating device on the lower side of the oxidizing gas applying nozzle structure is similar to that shown in Fig. 5 but differs therefrom in the construction of the orificed member, the construction preferably employed being shown in Fig. 6. Here, an orificed member or block 40 has an adjoining shell 41, the upper end of which is closed by a block 42 having a bore 43, to which is connected a gas supply conduit 44, which supplies a combustible heating gas from a mixing chamber 45, the bore 43 being shown as provided with a distributing cone 46 arising out of the partition back of the bore 43, this partition being perforated to provide orifices 47 which have a plurality of passage members 48 communicating with supply gas bores 49 in the orificed member or block 40. The bores 49 here do not have a reduced portion, as shown in Fig. 5, but, instead, communicate with recessed chambers 49", so shaped that a plurality of adjacent ribbon-like preheating jets issue from a series of slot-like orifices 49ª that are in line across the front of the block. To achieve the proper formation of the chambers 49" in the block 40 it is preferable to split the block into complemental sections as indicated, the sections being united when properly formed, by screws, as indicated at 40ᶜ. The shells 31 and 41, as shown in Figs. 5 and 6, are seen to have depending offset portions so as to be adapted to engage in complementary positions with the reduced portions 28 of the oxidizing gas nozzle structure. When positioned, they are held in place by means of a clamping device 50 which fits about the ends of the nozzle devices and has an under side 51 which serves as a shoe to ride upon the surface of the billet when a cut is being made; the shoe thus insuring the proper spacing of the nozzle devices from the billet when making a cut.

A suitable securing means 52 may also be placed about the chambers 35 and 45 to assist in maintaining the desired rigidity of the structure which is suspended from the supporting means 11 and arranged so that the orifice 24 is substantially parallel to the surface of the billet B which is being desurfaced, the nozzle structure being inclined at an angle such that the oxygen gas impinges at an acute angle to a tangent drawn to the surface of the billet B in the direction in which a cut is to be made, having a value preferably between 20 and 45 degrees.

The orificed members of the preheating devices, when in operation, are, of course, subjected to high temperature. It is advantageous, therefore, to cool the preheating devices during a desurfacing operation. To this end, the space in the shells 31 and 41 about the passage members 37 and 47 is employed for accomplishing the desired cooling. A cooling medium, such as water, is arranged to be circulated in this space and each of the closing blocks 32 and 42 is provided with at least two passages in addition to the central bores 33 and 43, one of which passages serves as the inlet for the cooling medium, the other serving as the outlet. The block 32, as clearly shown in Fig. 7, is provided with an inlet nipple 53 to which a flexible connection 54 is attached for supplying the cooling medium. An outlet connection is similarly provided at 55. A nipple 56 (see Fig. 2) having an inlet connection 57 is provided in the block 42, the same being provided with an outlet connection 58. The connections which supply gas to the conduits 29 and 29' and the mixing chambers 35 and 45, as well as the connections which supply and withdraw the cooling medium, are with advantage flexible in nature and are accordingly illustrated as a group of flexible tubings supported adjacent to the supporting means 11 by suitable holding means adapted to move with the same.

The oxidizing gas supplied to the conduits 29 and 29' may be pure oxygen having a suitable pressure, for example, 50 lbs. per sq. in. gauge, or a mixture of oxygen gas and a neutral gas, such as a mixture of oxygen with air or nitrogen. While the pressure head may be varied within a reasonable latitude, the pressure head is such as to maintain the issuance of the oxidizing gas at a suitable desurfacing velocity. Where a desurfacing operation of the character indicated is to be carried out, it has been ascertained that a so-called "low velocity" of a value substantially between 200 and 1000 ft. per second, as set forth in U. S. patent to Oldham, No. 1,957,351, is suitable with a cylindrical stream. A nozzle structure having a wide but thin orifice, when provided with a taper as above indicated, and with a relatively narrow throat at the inlet where the oxidizing gas enters the rectangular channel of the nozzle, has substantially the same limits to the velocity of the oxidizing gas stream as taught in the Oldham patent. By giving the nozzle channel a different shape, the limits are, of course, changed, and it may be desired under some conditions to exceed the so-called "acoustic velocity," which is the theoretical upper limit to the mouth velocity attainable from a nozzle of the type employed by Oldham. It will be understood therefore that the upper limit of the "low velocity" hereinafter referred to may exceed such acoustic velocity.

The surface removing device R is here shown as mounted to have substantially universal adjustment on the means which effects relative motion between it and the billet whose surface is to be removed, the supporting member 11 being shown as capable of imparting a vertical adjustment, the arm 12 being likewise shown as capable of imparting longitudinal adjustment while the carriage 13 is capable of imparting adjustment transversely of the billet; the frame F being arranged for carrying the device R, when properly adjusted, along the billets at a desired rate, for example, 60 ft. per minute when a cut is to be made. While such an arrangement is shown, it will be understood that this is purely exemplary, as any suitable arrangement may be employed, for example, the surface removing device may be stationary and the billets may travel. Also, it will be understood that it may be desirable to have the surface removing device swiveled to member 11 in such a manner that the axis of chamber 21 may be rocked up and down so that the orifice 24 may be tilted with respect to the surface of the billet B as occasion may require in order to follow any lateral warp which the billet may have.

The preheating devices shown in Figs. 2, 3, 5 and 6 are seen to apply relatively different types of preheating flames above and below the ribbon-like stream of oxidizing gas issuing from the nozzle 24. By the arrangement shown, a plurality of small jets issue from the orifice 39' which produce a relatively intense heating action of the metal just ahead of the impinged oxidizing gas. The ribbon-like preheating jets on the under side are seen, on the other hand, to effect a desired heating of the reaction puddle without any liability of impressing stream marks upon the surface of the billet trailing the cut. The cuts produced, in consequence, are substantially plane, wide and smooth, imparting a desired surface characteristic to the desurfaced billet.

To carry out a desurfacing operation with the above-described apparatus, an operator on the frame F adjusts the thermo-chemical surface removing device to a proper initial position, and having turned on the supply of heating gas and ignited the same, applies the same to a point on the billet where a cut is desired to be started. When the temperature is reached at which the metal will ignite with oxygen, which may be readily determined by a skilled operator, the oxidizing gas is turned on and the frame F started to move to carry the device R in the direction in which the surface is to be removed. The oxidizing gas which issues from the nozzle structure is seen to impinge in a thin plane sheet that meets the surface to be removed in a line and at an acute dihedral angle, the line extending for a substantial distance directly across the body being operated upon, and the region immediately at each side of the line is the zone where the oxidizing reaction is thermo-chemically carried on. The orifice of the nozzle structure being substantially rectangular and the pressure therealong being maintained substantially equal at all points, it is seen that the mass-velocity of the impinged oxidizing gas is substantially equal at all points along this line of reaction and the resulting metal removal is in substantially equal amount at all points where the oxidizing gas impinges. The cut when properly started may be carried at a substantially uniform speed along the entire length of the billet without being lost, provided the speed, the gas velocity, the gas volume and its angle of impingement are correlated and adjusted to maintain the reaction puddle, which forms ahead of the reaction zone, substantially constant. The reaction puddle, which thus forms, has characteristics of its own that distinguish it from those heretofore obtained. Such puddle is shown at P in Fig. 11, where the top surface of billet B is depicted together with a portion of the device R that is shown as extending substantially completely across the billet. The impinging ribbon-like stream of oxidizing gas is shown at S, the reaction zone being indicated by the broken line about the area impinged by stream S. The main body of the puddle advances in front of this zone and is indicated by the area bounded by the irregular full-line curve on the drawings. The puddle in this case extends entirely across the billet and has a width that is more than twice its dimension lengthwise of the billet. This characteristic is unique for wide orificed nozzle desurfacing and its homogeneity contributes to the uniformity of its heating effect on the metal of the billet over which it advances.

In the arrangement represented in Figs. 2 to 4, the transverse dimension of the orifice 24 may be of the order of a small fraction of an inch, while the width dimension may be of the order of a fraction of a foot, and is normally more than three inches. As an example, it has been found in practice that an orifice 3/32 of an inch in the transverse dimension and 6 inches wide is suitable for desurfacing a whole side of a standard six-inch billet to a substantially uniform depth, such as 1/16 inch, in one pass. While the nozzle structure here provided may have substantially any desired width greater than the limit above indicated and still give an uninterrupted ribbon-like oxidizing gas stream that produces substantially equal oxidizing reactions across its line of impingement, it will be understood that the surface-removing device is not confined to operations in a horizontal plane, i. e., upon the top surface of a billet B, but may be arranged equally well to remove side and bottom surfaces; it being contemplated applying the present invention to machines for removing relatively plane surfaces generally, or a series thereof; for example, opposite sides or all four sides of billets may be removed in one pass. Also, the surface may be arc-shaped, so that the orifice is not a straight line but may be a portion of an arc. It will be understood further that the desurfacing device of the present invention, while shown in combination with preheating nozzle devices which effect the removal of surface metal from cold billets, is equally applicable to devices intended for the removal of metal from the surface of hot metal bodies, for example, from the surface of blooms as they come from the blooming mill in steel mill practice. In such case, certain of the preheating devices may be cut out of operation or removed from the construction employed altogether.

The removal of surface metal from ferrous metal bodies in wide uniform paths is seen to eliminate more efficiently than heretofore the surface defects desired to be removed, since the making of wide smooth cuts over the surface of the body, without the formation of grooves or ridges demarking the paths of individual oxidizing gas streams, avoids the accidental retention by such marks or ridges of unobserved or unobservable defects.

The resulting ferrous body when desurfaced with a wide ribbon-like oxidizing stream, as here proposed, has new properties imparted thereto and differs from bodies heretofore obtained by desurfacing operations, particularly those which employ a plurality of oxidizing streams, in that the body is provided with a new envelope which is substantially level or ungrooved and is smooth and has a uniformly distributed carbon content, and the resulting body is highly ductile. The differences are readily apparent in photomicrographs made of the surface portions of such bodies and are illustrated in Figs. 8 to 10.

In Fig. 8, a photomicrograph is depicted which shows a section of a billet, which has been desurfaced by the use of a plurality of oxygen streams, in the neighborhood of a ridge showing a heat affected zone that extends from the top to a point about .06 inch below the surface. Here, the light portions $a$ indicate a composition that is chiefly martensite, which includes a small portion of troostite indicated by the dark portions $b$. The presence of these constituents and the substantial absence of ferrite in this zone indicates an increase in carbon content and an increase in the hardness of the billet as the surface is approached. Such a structure as a rule produces a high degree of brittleness. There is a darker zone $c$ immediately below the upper zone that exhibits a sorbitic formation. At a point about .02 inch below the top, or cut edge of the section, ferrite, depicted at $e$ and shown mostly as white, makes its appearance in zone $d$ and increases in amount from the point of its appearance downward toward the unaffected metal. The ferrite is seen to surround certain dark areas which are sorbite. Had the metal of this section been cooled more slowly, these dark areas would have been pearlite.

In Fig. 9, another photomicrograph depicts the structure of the same billet in a flat area between ridges and is quite similar in appearance to Fig. 8 with the exception that the outer zone $f$ is pseudo-martensitic instead of troostomartensite. No ferrite is present near the surface; other experiments show that this is correlated with increased carbon content.

In Fig. 10 is depicted a representation of a photomicrograph showing the structure, on the same scale as in Figs. 8 and 9, of a billet of similar composition to the former but desurfaced with a wide orificed nozzle according to the present invention. Here, the microstructure shows that the surface layer has undergone little or no carburization. An appreciable amount of ferrite, as indicated at $g$, is present in the uppermost zone together with pseudo-martensite and sorbite. Although the background is dark, this should not be confused with the pseudo-martensite. The depth of the heat affected zone in this case is about .038 inch. Below the top zone the region $h$ contains ferrite and sorbite, the dark portion $i$ being the sorbite. This indicates that the temperature attained at a region corresponding to the zone $h$ was sufficiently high and present for such a period of time that a certain amount of austenite was formed and decomposed to sorbite at or below .01 inch as seen in zone $j$ and $i$. The metal either was not heated to the transformation temperature or was heated for so short a time that the concentration of carbon in austenite did not take place. Thus, the resulting structure is pearlite in ferrite, the normal practically unchanged structure of steel. A comparison of Fig. 10 with Figs. 8 and 9 shows that pearlite areas are coarser and closer to the surface with the ferrite extending all the way to the surface and, as a corollary to this, the ductility of the structure of Fig. 10 is superior to that of Fig. 8 or 9. From this comparison of the microstructure it may be concluded that the billet surface produced according to the present invention has a greater degree of ductility than the structures produced in Figs. 8 and 9. In addition, the surface structure shown in Fig. 10 is representative of the entire surface produced by the methods of the present invention, whereas the surface produced by multiple oxygen streams shows marked changes between the top of the groove and the bottom. This is also proved by hardness tests by the Monotron hardness tester. Such measurements showed a hardness of 100 to 425 at the top of the ridge and 270 in the trough of the groove.

A billet of the same composition, desurfaced according to the present invention, when tested, exhibited a hardness at various places that was extremely uniform and averaged 185 converted Brinell. This was found in spite of the fact that the interior of the latter billet exhibited an original hardness of 112 as compared to 107 in the former.

When billets desurfaced by both methods are reheated in a furnace to rolling temperature, substantially greater oxidation occurs at the surface of those which are desurfaced by multiple oxygen streams. Those billets which were desurfaced by the multiple oxygen stream show excessive oxidation on the top of the ridges when preheated in a furnace.

Referring to Fig. 12, a row of separate interchangeable oxidizing gas nozzle units 60 is provided to form the inner nozzle structure. Disposed above and below the oxidizing gas nozzle units 60 are rows of separate and interchangeable gas burners or flame units 61 and 62. Each of these gas flame units is connected to a separate source of suitably premixed combustion supporting gas and combustible gas, such as a mixture of oxygen and acetylene. A rectangular metal member 63 surrounds the nozzle units 60, 61 and 62, and is provided with set-screws 64 in its upper portion 65 which engage the upper burner units 61, clamping all of the nozzle units together in properly assembled relation.

By loosening the screws 64 any one or all of the nozzle units may be released for replacement, repair or adjustment, as desired. The nozzle units preferably consist of highly heat-conductive material such as metal, so that the cooling fluid such as water which is circulated through each of the burner units prevents the entire device including the oxidizing gas nozzle units 60 from overheating in use. The scarfing width of the device may be changed by merely increasing the number of oxidizing gas nozzle units and gas flame units, as desired, and securing them in assembled relation with a member 63 of the appropriate size to receive rows containing one, two, or any number of groups of preheating and oxidizing gas units.

Referring to Figs. 13 and 14, the blowpipe device illustrated is somewhat similar to that shown in Fig. 12, but includes separate post-mixed gas flame units 70 instead of the premixed gas flame units 61 and 62. The upper and lower gas flame units have burner heads or tips 71 of the type disclosed and claimed in application Serial No. 326,880, filed March 30, 1940. Each tip 71, for example, has an end face 72 provided with a row of suitably spaced gas outlet ports 73. Separate gas passages 74 and 75 intersect at substantially the center of each of the ports 73. A combustion supporting gas such as oxygen is supplied to the passages 74 through a common distributing chamber 76, while a combustible gas such as acetylene is supplied to the passages 75 through a common distributing chamber 77.

Each metal tip 71 may also be provided with a cooling fluid passage 78 which is connected to the cooling fluid chamber 79 within the unit 70. The relatively small streams of oxygen and acetylene discharged by the passages 74 and 75 through each of the common ports 73, collide at high velocity at the mouth of the port to form a combustible mixture, and, when ignited, produce in free space an intense substantially constant flame of high temperature. The composite externally mixed flame produced by the row of ports 73 is substantially non-luminous and in the form of a ribbon characterized by a row of stable and closely-spaced primary combustion zones.

The post-mixed gas flame units 71 may have any desired number of ports 73. In fact each unit may have only one port 73, and as many of such units may be used as may be necessary to cover a given width of the work to be scarfed. Likewise, the units 60 for the oxidizing gas may have one or more ports instead of a single slot. The premixed or postmixed gas flame units also may be omitted from either the top or bottom of the oxidizing gas units, if desired, for certain types of ferrous metal scarfing with oxygen.

Post-mixed gas burners are ideal for thermochemical desurfacing work, because explosions due to backfiring or flashbacks are entirely eliminated by their use. In the past such explosions have created a serious hazard in large installations and have required precise and expensive internal gas mixing and delivering apparatus for their reduction. Where post-mixed gas flame units are employed, however, such expensive apparatus is not required, and since the externally mixed gas flame may be slightly oxidizing in character, entirely satisfactory desurfacing results, at a substantial reduction in the cost of the apparatus and also in the cost of its installation and up-keep, and with the elimination of all danger and damage due to explosions within the apparatus. Post-mixed gas flame heads have this marked advantage of not backfiring even when the heads are heated to a high temperature, while the heat transfer to the surface metal of the body being treated is about the same as for premixed gas flames. The unique shape of the externally mixed flame produced by each detachable preheat unit 70, which shape is fully described in said application Serial No. 326,880, is also ideal for preheating the ferrous metal in a desurfacing operation, especially where a relatively wide area is being scarfed by the blowpipe device.

Since the gas flame units are interchangeable, any desired combination of the separate gas flame units may be employed. For example, post-mixed and premixed gas flame units may be used together and they may be of the same or different types, i. e., having round or slotted ports. Or, if desired, all of the units may be of one kind such as post-mixed, and of the same type, as shown in Figs. 13 and 14. These units are securely fastened together so that the preheat flames are in proper relation to the cutting oxygen jet. The use of small detachable preheat units in multiple has the advantage of making it possible to standardize one size supplied with a preheating gas mixture from a small, simple unit mixer, or in the case of the post-mixed heads, from the main header lines through pipes 83 and 84, passages 85 and 86, pipes 87 and 88, and passages 89 and 90, respectively, for the individual gases. The blowpipe devices of the invention may be used to scarf or deseam one or more of the lateral and bottom surfaces of the ferrous metal body B as well as the top surface 80 thereof in either one or more passes of such body with respect to such blowpipe devices, and while such body B is either hot or cold.

The bottom portion 81 of the clamping member 63 is coated with a layer 82 of exceptionally hard metal such as a "Stellite" alloy which is exceptionally resistant to heat and wear, for riding on the hot surface 80 of the body B, to protect the lower tips 71 and the member 81 from disintegration in use, since the tips 71 preferably consist of copper and the member 81 mainly of steel or Monel metal.

Parts not specifically referred to or described above in the description of Figs. 12 to 14 are substantially similar in construction to the corresponding parts of Figs. 1 to 6, the assembly of the parts of Figs. 12 to 14 is, in general, similar to that of Figs. 1 to 6, and the operation of the blowpipe devices of Figs. 12 to 14 is substantially the same as that set forth above in connection with Figs. 1 and 11. However, where a number of the oxidizing gas nozzle units 60 are disposed in side-by-side relation, the form of the distributing means 21 is such that pipes 29 and 29', Fig. 4, do not interfere with the arrangement shown in Figs. 12 and 14. For example, the end portions of the pipes may be merely disposed within the ends of each cylindrical chamber rather than externally thereof as shown in Fig. 4.

Since certain changes may be made in carrying out the above process and in the product, and modifications effected in the apparatus for practicing the principle thereof, without departing from the scope of the invention, it is intended that all matter contained in the above description or shown in the accompanying drawings shall be interpreted as illustrative and not in a limiting sense.

What is claimed is:

1. In a blowpipe device for thermochemically removing metal from a metal body, means comprising a nozzle structure having a front face; an oxidizing gas passage therethrough terminating in an outlet orifice in said front face, said passage and outlet orifice being shaped to project a metal removing stream of oxidizing gas; and externally mixed preheating flame means for projecting a post-mixed preheating flame closely adjacent to and in the same direction as said metal removing stream to cooperate therewith in thermochemically removing metal when said stream and said flame are projected against a surface of said body, said preheating flame means comprising at least one port positioned adjacent said outlet orifice in said front face, a pair of gas passages with longitudinal axes converging and intersecting substantially in said port, means for supplying oxidizing gas to one of said gas passages, and means for supplying fuel gas of high calorific value to the other of said gas passages, said gases being supplied at substantially equal pressures whereby the gas streams issuing from said passages collide at high velocity at the mouth of said port and, when ignited, produce said post-mixed preheating flame.

2. A blowpipe device comprising, in combination, an oxidizing gas nozzle unit having a discharge orifice, a separate flame nozzle unit comprising a tip of metal having an end face provided with a gas outlet port and a pair of gas passages having their longitudinal axes intersecting at substantiallly the center of said port, whereby oxygen may be discharged by one of said passages through said port and a fuel gas of high calorific value may be discharged by the other passage through said port, so that the relatively small oxygen and fuel gas streams collide at high velocity in free atmosphere at the mouth of said port and, when ignited, produce in free space an intense substantially constant flame of high temperature, and means connecting said units in assembled relation so that said port of the flame nozzle unit is adjacent the discharge orifice of the oxidizing gas nozzle unit.

3. A blowpipe device comprising, in combination, an oxidizing gas nozzle unit having passage means terminating in orifice means adapted to discharge an oxidizing gas to produce a wide, flat stream of said gas, a separate flame nozzle unit adjacent a wide side of said oxidizing gas nozzle unit for producing in free space an intense substantially non-luminous flame substantially in the form of a ribbon of high temperature characterized by a row of stable substantially closely spaced primary combustion zones, said flame nozzle unit comprising a head having a series of spaced parallel outlet passages for discharging relatively small oxidizing gas streams at a relatively high velocity, and a series of corresponding spaced parallel outlet passages for simultaneously discharging relatively small fuel streams at relatively high velocity, said outlet passages being disposed for so directing said oxidizing and fuel streams that they converge at high velocity with the longitudinal axes of said outlet passages and streams lying in substantially common spaced parallel planes and said axes of the corresponding oxidizing gas passages intersecting at an included angle such that the kinetic impact of said streams is effective to form a combustible mixture in said zones, said head having a surface at which said oxidizing stream outlet passages intersect said fuel stream outlet passages, and means connecting said separate units in assembled relation.

4. A blowpipe device for scarfing ferrous metal comprising, in combination, a row of interchangeable flame nozzle units adapted to produce in free space an intense substantially non-luminous flame substantially in the form of a ribbon of high temperature characterized by a row of stable substantially closely spaced primary combustion zones, a corresponding row of interchangeable oxidizing gas nozzle units adapted to discharge an oxidizing gas to produce a wide, flat stream of said gas adjacent said flame, means connecting all of said units in assembled relation with the individual units of each respective row in end-to-end alignment, and with said rows in parallel relation with each other, means for supporting said units in a position such that the oxidizing gas is obliquely impinged upon a surface to be removed, and means for effecting relative motion between a body to be operated upon and said blowpipe device.

5. A blowpipe device comprising, in combination, an oxidizing-gas nozzle unit having a discharge orifice and consisting of highly heat-conductive metal, a pair of flame nozzle units consisting of high heat-conductive metal, said flame nozzle units being mounted on opposite surfaces of said oxidizing-gas nozzle unit in metal-to-metal contact therewith, each of said flame nozzle units comprising a tip having an end face provided with a gas outlet port and a pair of gas passages having their longitudinal axes intersecting at substantially the center of said port, whereby oxygen may be discharged by one of said passages through said port and a fuel gas of high calorific value may be discharged by the other passage through said port so that the relatively small oxygen and fuel gas streams collide at high velocity in free atmosphere at the mouth of said port and when ignited produce in free space an intense substantially constant flame of high temperature, and means securing all of said units together so that said ports are adjacent the discharge orifice of the oxidizing gas nozzle unit, said means comprising a member having an external protective portion consisting of metal such as a "Stellite" alloy adapted to ride on a ferrous metal scarfed by the flames and oxidizing gas discharged by said blowpipe device.

6. A blowpipe device having passage means terminating in orifice means adapted to discharge an oxidizing gas to produce a wide, flat stream of said gas, said device having adjacent a wide side of said orifice means a series of spaced parallel outlet passages for discharging relatively small oxidizing streams at a relatively high velocity, and a series of corresponding spaced parallel outlet passages for simultaneously discharging relatively small fuel streams at relatively high velocity, said outlet passages being disposed for so directing said oxidizing and fuel streams that they converge at high velocity, the longitudinal axes of said outlet passages and streams lying in substantially common spaced parallel planes and said axes of the corresponding oxidizing gas passages and fuel gas passages intersecting at an included angle such that the kinetic impact of said streams is effective to form a combustible mixture in primary combustion zones, said device also having a surface at which said oxidizing stream outlet passages intersect said fuel stream outlet passages to produce in free space an intense substantially non-luminous flame substantially in the form of a ribbon of high temperature adjacent said wide, flat stream of oxidizing gas, said flame being characterized by a row of stable substantially closely spaced primary combustion zones.

7. A blowpipe device for thermochemically desurfacing ferrous metal bodies, said device having passage means terminating in an elongated orifice constructed and arranged to discharge an oxidizing gas in the form of a wide flat desurfacing stream, and externally mixed preheating means having at least one port adjacent said oxidizing gas orifice arranged to project a post-mixed preheating flame adjacent to but without interference with a wide side of said desurfacing stream, said preheating means comprising a pair of gas passages with longitudinal axes converging and intersecting substantially in said port, means for supplying oxidizing gas to one of said gas passages, and means for supplying fuel gas of high calorific value to the other of said gas passages, said gases being supplied at such pressure that the gas streams issuing from said passages collide at high velocity at the mouth of said port and, when ignited, produce said post-mixed preheating flame of high intensity.

8. A blowpipe device for thermochemically removing metal from a metal body comprising, in combination, a flame nozzle unit having at least one outlet port, an oxidizing gas nozzle unit having an outlet orifice adjacent said outlet port, said units consisting of highly heat-conductive material, means securing said separate units in contacting assembled relation, means for circulating a cooling liquid in contact with at least one of said units to prevent the blowpipe device from overheating in use, said flame nozzle unit having a pair of gas passages with longitudinal axes converging and intersecting substantially in said port, means for supplying oxidizing gas to one of said passages, and means for supplying fuel gas of high calorific value to the other of said gas passages whereby the gas streams issuing from said passages collide at high velocity at the mouth of said port and, when ignited, produce a post-mixed preheating flame of high intensity adjacent the oxidizing gas stream produced by said oxidizing gas nozzle unit.

9. A blowpipe device for thermochemically desurfacing ferrous metal bodies, said device having passage means terminating in an elongated orifice constructed and arranged to discharge an oxidizing gas in the form of a wide flat desurfacing stream, and externally mixed preheating means having at least one port adjacent said oxidizing gas orifice arranged to project a post-mixed preheating flame adjacent to but without interference with a wide side of said desurfacing stream, said preheating means comprising a pair of gas passages with longitudinal axes converging and intersecting substantially in said port, said intersecting axes lying in a plane which is substantially perpendicular to the wide transverse dimension of said elongated orifice, means for supplying oxidizing gas to one of said gas passages, and means for supplying fuel gas of high calorific value to the other of said gas passages, said gases being supplied at a pressure such that the gas streams issuing from said passages collide at high velocity at the mouth of said port and when ignited produce said post-mixed preheating flame of high intensity.

HOMER W. JONES.
WILGOT J. JACOBSSON.